(12) United States Patent
Jessen

(10) Patent No.: US 9,155,424 B2
(45) Date of Patent: Oct. 13, 2015

(54) NUT OPENER

(76) Inventor: John W. Jessen, Shoreline, WA (US)

( * ) Notice: Subject to any disclaimer, the term of this patent is extended or adjusted under 35 U.S.C. 154(b) by 0 days.

(21) Appl. No.: 13/450,466

(22) Filed: Apr. 18, 2012

(65) Prior Publication Data

US 2013/0097874 A1    Apr. 25, 2013

Related U.S. Application Data

(60) Provisional application No. 61/477,084, filed on Apr. 19, 2011.

(51) Int. Cl.
*A47J 43/26* (2006.01)

(52) U.S. Cl.
CPC ....................................... *A47J 43/26* (2013.01)

(58) Field of Classification Search
CPC ........ A47J 43/26; A22C 21/062; A22C 29/46; A47G 21/062
USPC ................ 30/120.1–120.5, DIG. 3, 278, 150; D7/680, 693, 683, 685–687; 108/43; 452/16, 17; 99/578, 581, 568; 294/99.2
IPC   A47J 43/26; A22C 21/062, 9/46; A47G 21/062
See application file for complete search history.

(56) References Cited

U.S. PATENT DOCUMENTS

| D1,249 S | * | 6/1860 | Smith | D7/680 |
|---|---|---|---|---|
| 448,155 A | * | 3/1891 | Merrill | 294/99.2 |
| 1,113,990 A | * | 10/1914 | Henderson | 99/583 |
| 2,638,805 A | * | 5/1953 | Bigelow | 269/3 |
| 2,989,103 A | * | 6/1961 | Carlson | 30/120.4 |
| 3,116,770 A | * | 1/1964 | Kazuo | 30/114 |
| 3,126,576 A | * | 3/1964 | Johannseen | 452/3 |
| 3,152,627 A | * | 10/1964 | Janic, Jr. | 30/120.1 |
| 3,589,420 A | * | 6/1971 | Davis | 99/572 |
| D228,054 S | * | 8/1973 | Craft | D7/680 |
| D342,870 S | * | 1/1994 | LeClair | D7/693 |
| 5,351,402 A | * | 10/1994 | Mansfield | 30/120.3 |
| 5,520,119 A | * | 5/1996 | Eisenberg | 108/43 |
| 6,675,721 B2 | * | 1/2004 | Zeiders | 108/43 |
| 6,986,308 B1 | * | 1/2006 | King et al. | 108/43 |
| D606,371 S | * | 12/2009 | Kiraly | D7/688 |
| D664,816 S | * | 8/2012 | Difante | D7/686 |
| 8,474,143 B2 | * | 7/2013 | Wedderburn | 30/129 |
| 2005/0181716 A1 | * | 8/2005 | Gillespsie | 452/2 |

FOREIGN PATENT DOCUMENTS

| CN | 377496 | * | 6/1964 | ............. A47J 43/26 |
|---|---|---|---|---|
| DE | 1255880 | * | 12/1967 | ............. A47J 43/26 |
| DE | 20111818 | * | 10/2001 | ............. A47J 43/26 |
| FR | 2159585 | * | 6/1973 | ............ A47G 21/062 |
| FR | 2585553 | * | 2/1987 | ............. A47J 43/26 |
| FR | 2678501 | * | 1/1993 | ............. A47J 43/26 |
| FR | 2759891 | * | 8/1998 | ............. A47J 43/26 |

* cited by examiner

*Primary Examiner* — Laura M Lee
(74) *Attorney, Agent, or Firm* — DWC Law Firm, P.S.; David Chen

(57) ABSTRACT

A nut opener having a cup-like member that is generally aligned with a tooth member. As a handle portion of the nut opener is squeezed, the tooth member can abut against a nut placed within the cup-like member, and cause shells of the nuts to release from the nut.

8 Claims, 10 Drawing Sheets

NUT OPENER

CROSS-REFERENCE TO RELATED APPLICATION(S)

This application claims the benefit of U.S. Provisional Patent Application Ser. No. 61/477,084, filed Apr. 19, 2011, which is incorporated herein by reference in its entirety.

BACKGROUND

1. Field of the Disclosure

The present disclosure relates generally to an apparatus and methods for opening nuts.

2. Description of Related Art

Some patented back-action forceps type devices, such as, for example, U.S. Pat. No. 4,462,156 apply a prying force with two or more relatively large, thick forceps tips that only fit into nuts with a relatively wide openings between the shell halves and do not provide mechanical advantage to make it easier to open the nut. They can be inconvenient as the user must hold the nut with the opposite hand to insert the tips, and as the shell halves of the nut are split, the user must palm the nut to catch it in his or her hand.

BRIEF SUMMARY

In the present disclosure, in some embodiments, a single pointed splitting wedge shaped tooth on an upper jaw can produce a 4x multiplication of force and mechanical advantage to easily engage and split even problematic, barely open pistachio nuts with only a tiny crack in their back. The splitter or tooth can be angled and sharpened so that the nut is pulled into the splitter by the positive rake of the tooth as it is pushed into the notch in the nut. Rims of the shell halves of the nut then can slide against smooth, radiused perpendicular faces on either side of the splitter tooth as it passes through the notch. The nut can remain intact during this action. This BRIEF SUMMARY section is not intended to identify key features or essential features of the claimed subject matter, nor is it intended to be used as an aid in determining the scope of the claimed subject matter.

DETAILED DESCRIPTION

In the following description, certain specific details are set forth in order to provide a thorough understanding of various embodiments of the disclosure. However, upon reviewing this disclosure, one skilled in the art will understand that the various embodiments may be practiced without many of these details. In other instances, some well-known structures and methods associated with opening nuts or tong-like or tweezer-like structures have not been described in detail to avoid unnecessarily obscuring the descriptions of the embodiments of the disclosure.

In the present description, the terms "a" and "an" as used herein refer to "one or more" of the enumerated components. The use of the alternative (e.g., "or") should be understood to mean either one, both, or any combination thereof of the alternatives. As used herein, the terms "include" and "comprise" are used synonymously, which terms and variants thereof are intended to be construed as non-limiting.

Figure 1:
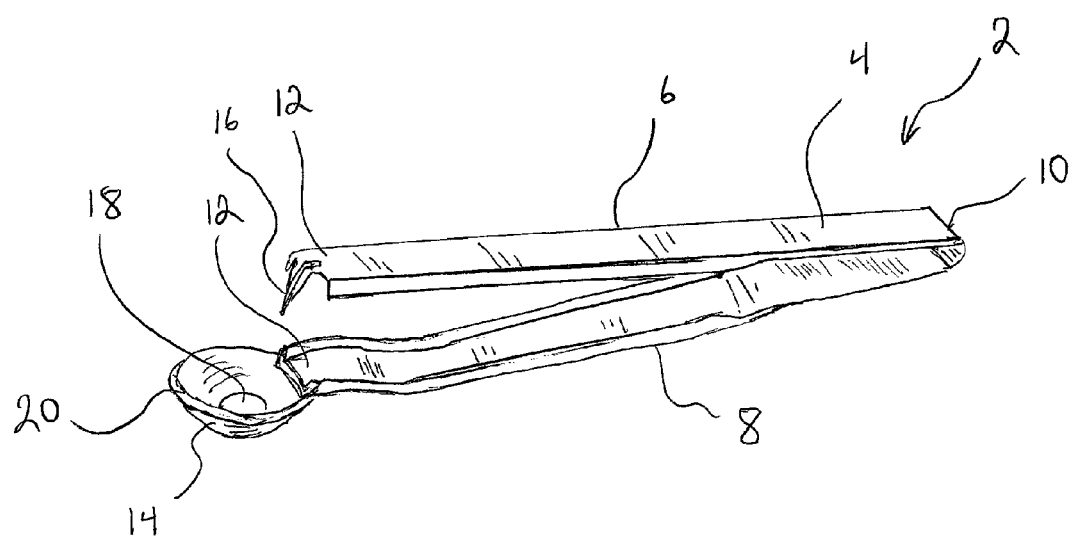
FIG. 1 is a top perspective view of a nut opener for some embodiments of the present disclosure.
Figure 2:
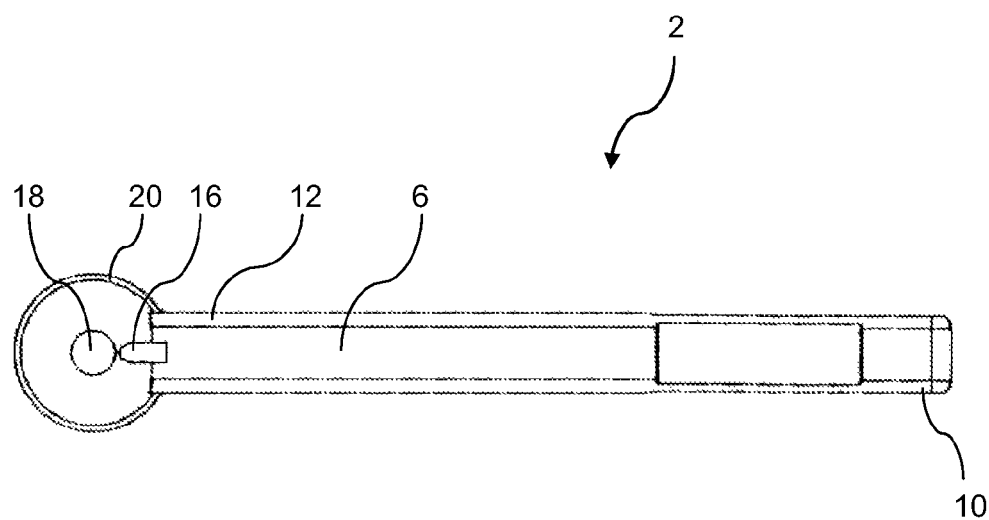
FIG. 2 is a top plan view of the nut opener of FIG. 1
Figure 3:
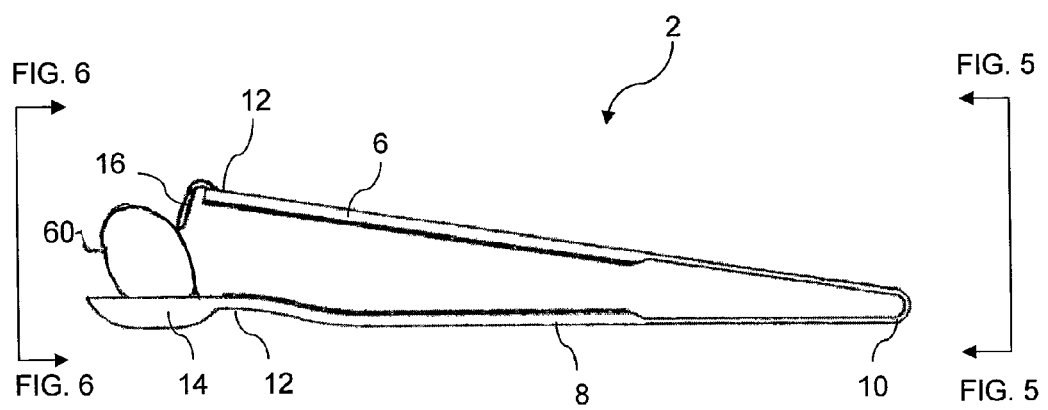
FIG. 3 is a side elevation view of the nut opener of FIG. 1.
Figure 4:
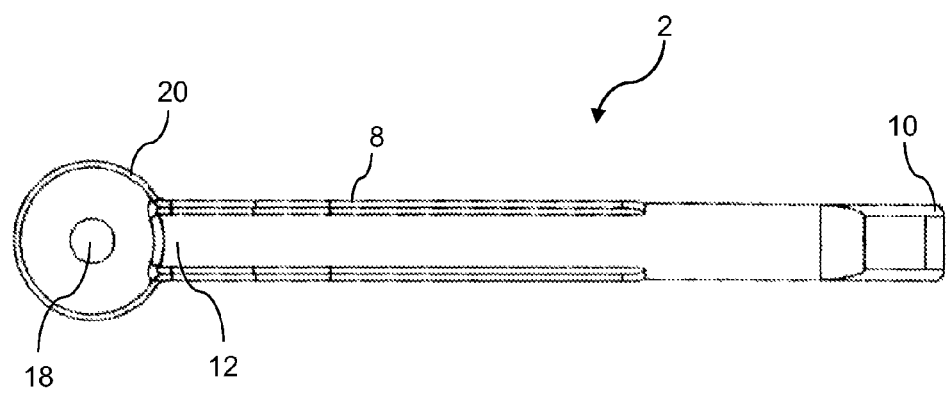
FIG. 4 is a top cutaway plan view of the nut opener of FIG. 1, showing only a back end portion of the upper elongated member.
Figure 5:
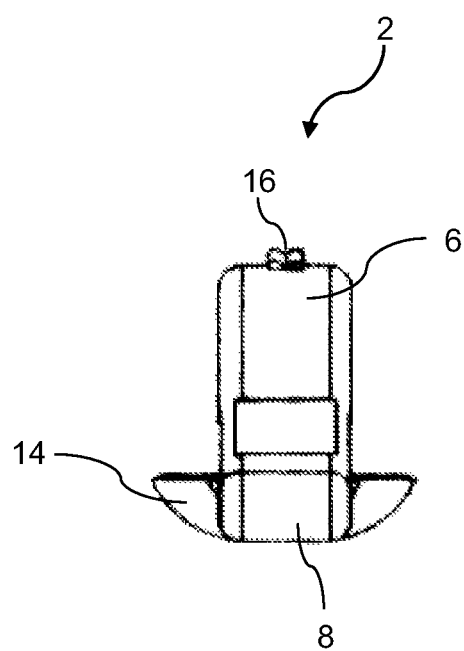
FIG. 5 is a back side elevation view of the nut opener of FIG. 1

Referring to FIGS. 1-6, a nut opener 2 of the present disclosure is provided having a tong-like handle portion 4 with an upper elongated member 6 and a lower elongated member 8, the elongated members being joined at a back-end 10. The elongated members 6, 8 can be made of, for example, a stamped sheet stainless steel. In some embodiments, the length of the elongated members can each be approximately four and one half (4½) inches long. The tong-like handle portion 4 has a resting open position as shown in FIGS. 1 & 4; however, the material(s) of construction can be steel (as described above) and can have spring characteristics so that when the front end portions 12 of the elongated members are compressed together manually, then released, the biasing characteristics of the steel can cause the elongated members 6, 8 to revert to their resting open position, ready to be compressed together again.

Figure 6:
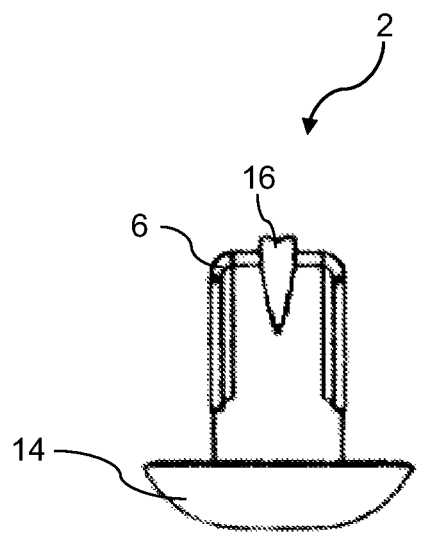
FIG. 6 is a front side elevation view of the nut opener of FIG. 1
Figure 10:
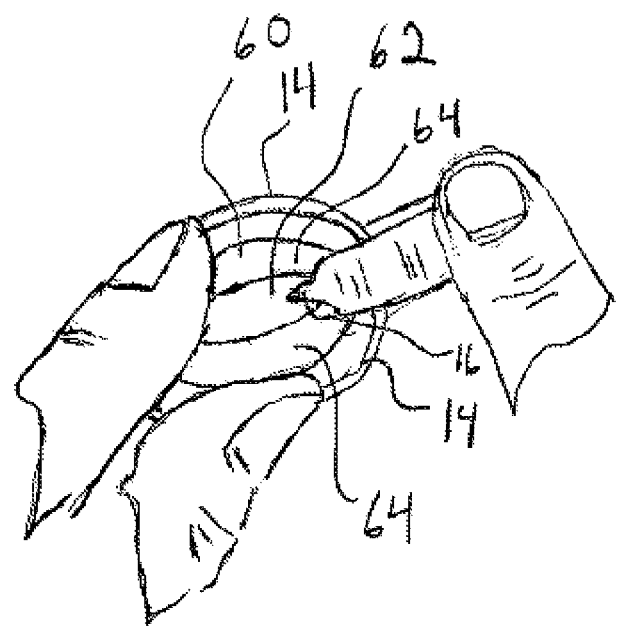
FIG. 10 is a simplified drawing showing the cup and tooth for an embodiment of the nut opener of FIG. 1 in use, mounted on the base mount, with a pistachio nut placed in the cup of the nut opener and positioned for opening.

In some embodiments, a cup 14 is formed on, or attached to, a front end portion 12 of the lower elongated member 8. In addition, a tooth or splitting member 16 is formed on, or attached to, a front end portion 12 of the upper elongated member 6. As best seen in FIG. 6, the tooth member 16 can have a front cross section portion that is generally triangular or wedge-like in shape, having a sharp or pointed tip end portion, which faces downward, with a gradually widening width extending upward along the tooth with a maximum width near a base portion of the tooth, at or near the upper elongated member 6. In some embodiments, the tooth has an longitudinal axis that aligns or points generally toward the cup 14. A nut, such as, for example, a pistachio, can be placed into and held by the cup 14. In some embodiments, a butt of the pistachio nut 60 can be placed in the cup (See, e.g., FIGS. 3 and 10), with a split or crack 62 in the shell 64 of the nut 60 positioned vertically directly below the tooth 16. When, in some embodiments, the nut opener is mounted on a base mount 22, the user can be free to use only one hand to place the nut 60 within the cup 14, as the user does not require his/her opposite hand to stabilize the nut during operation of the opener 2.

In some embodiments, the cup 12 has a small flat circular bottom inside surface, or "flat" 18, and a radius rim 20 that is configured to allow a pistachio nut 60 to be stabilized in the cup during opening. The nut may be any of various sizes. The bottom of the nut 60 can freely come to rest on the flat 18 with the rims of the shell halves of the nut 60 resting on a portion of the rim 20 of the cup 14. During use, as a user can compress the elongated members 6, 8 of the handle portion together, and a tip portion of the tooth 16 can enter the split portion, crack, or notch 62, of the nut 60 (See, e.g, FIG. 10) and this can cause the nut 60 to shift until it stabilizes within the cup 14, then splits open, leaving the nut (minus shell that is) intact. The shells can fall away, as the diameter of the rim is wider than the shell width. That is, for example, the cup's semispherical, flat bottom shape allows the tapered, egg-shaped nut shell halves to fall or slide apart unobstructed as the nut is split. In addition, in some embodiments, if desired, users can use the thumb and fingers of their opposite hand to control the shell halves and prevent them from flying apart when the nut splits. When the lower elongated member 8 of the handle 4 is attached to the base mount 22, the thumb and fingers of one hand can function together to both push down the upper elongated member 6 of the handle 4 to split the nut and, at the same time, prevent the shell halves from flying apart (see attached photo sequence). As will be appreciated by those skilled in the art after reviewing this disclosure, larger nuts are pushed farther to the side of the flat and farther up the rim and vice versa for smaller ones.

In some embodiments, as the front end portions 12 of the elongated members are compressed together manually, the tooth member 16 descends downward toward the cup 14, and can descend downward so far as to touch the cup (or abut against a nut in the cup). Referring to FIG. 6, in some embodiments, as the tooth member 16 descends (on a radius path about a point on the back-end portion 10 where the elongated members 6, 8 join), the tip portion of the tooth member may be at an outwardly inclined position and turn inward (e.g., toward the back-end portion). This can allow the tooth member 16 to contact the nut 60 at one angle (at an outwardly sloping incline), and to turn inward as the tooth member descends along a radius path until, for example, the tooth member is perpendicular with the flat bottom 18 surface or at another inwardly turned position, depending on how it is disposed relative to the front end portion 12.

As will be appreciated by those skilled in the art, the nut opener 2 is a unique hand-held tool for quick and easy opening of nuts, such as pistachio nuts. It can be especially helpful to those individuals with limited ability to use their hands or fingers. This includes those with manicured fingernails. The small, ergonomic configuration of the nut opener 2 can allow users to keep it in their hand and naturally "palm" it and not need to put it down while working through a portion of pistachios.

Figure 7:
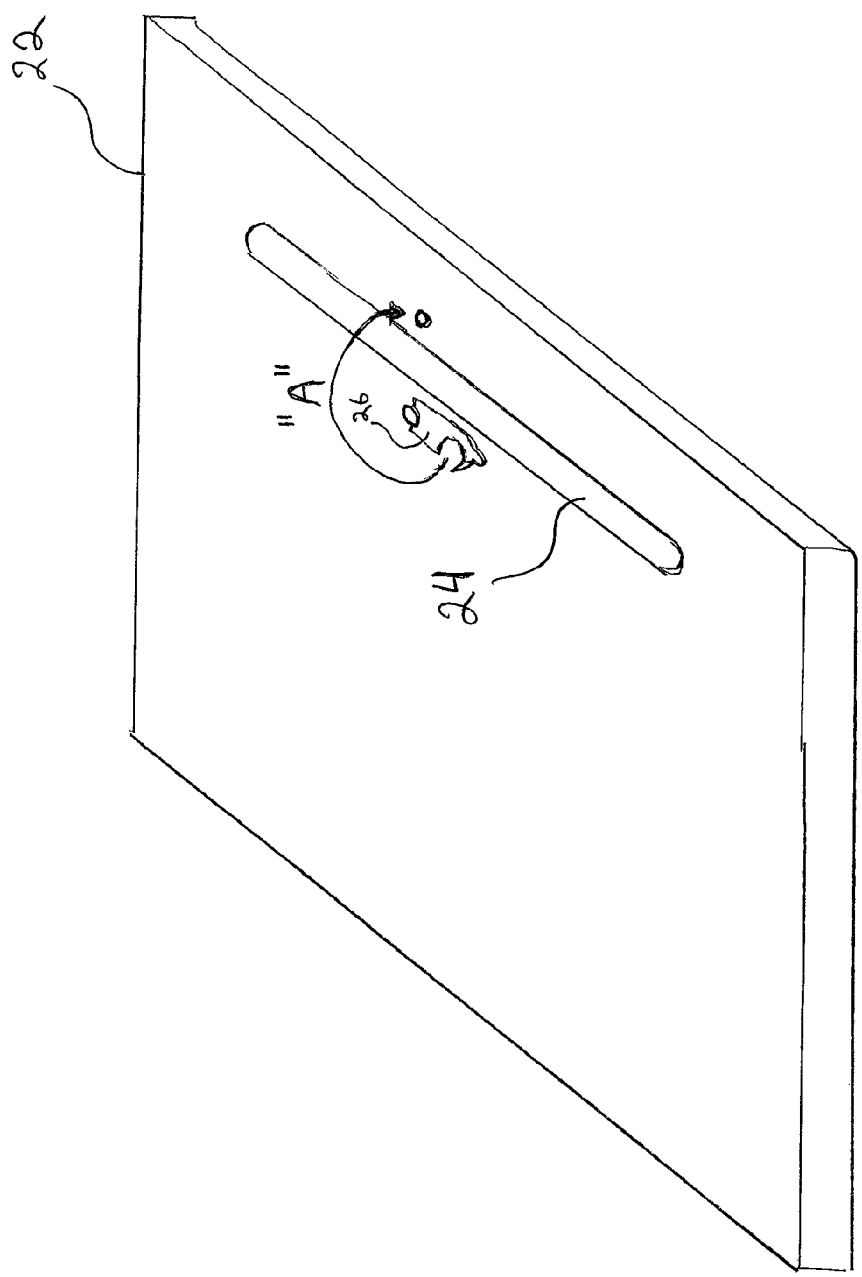
FIGS. 7 & 8 show an embodiment of a base mount for use with some embodiments of the nut opener of FIG. 1
Figure 8:
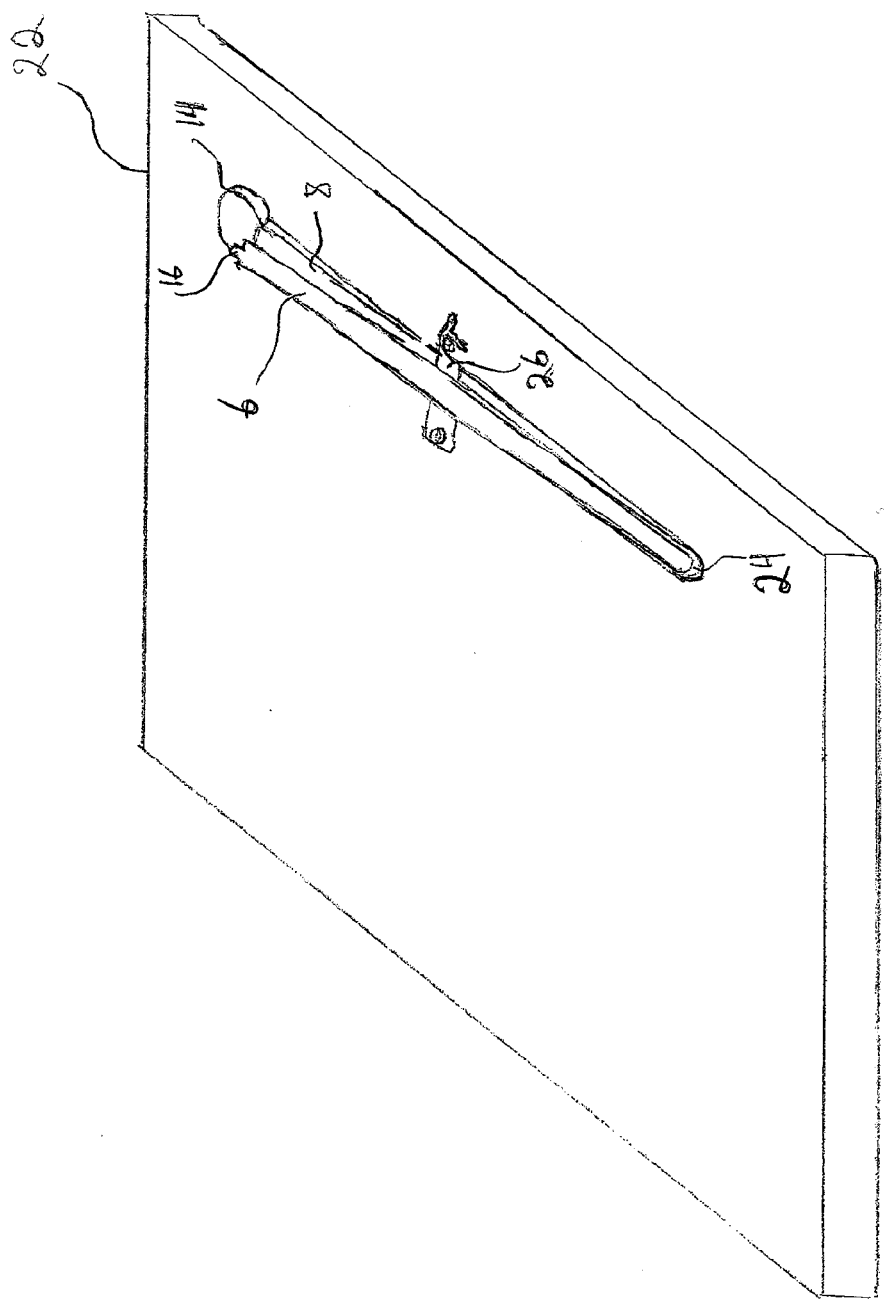

Referring to FIGS. 7 & 8, in further embodiments of the present disclosure, a base mount 22 is provided, which can be a small board having a shaped groove 24 into which the lower elongated member 8 of the nut opener 2 can be placed. Thereafter, a swivel lock member 26 can be pivoted in the direction shown by arrow "A" in FIG. 7, to slide over the lower elongated member 8 and lock it within the groove 24. As shown in FIG. 8, the nut opener can thus be position for user on the base mount 22. In this configuration, with the base mount 22 placed on a surface, the nut opener 2 can be easily loaded with nuts and operated by simply pressing down on the upper jaw or upper elongated member 6, similar to operating a stapler. In this configuration it may even be loaded easily and operated easily by someone with only limited functionality of one hand (e.g., such as a stroke victim or amputee).

Figure 9:
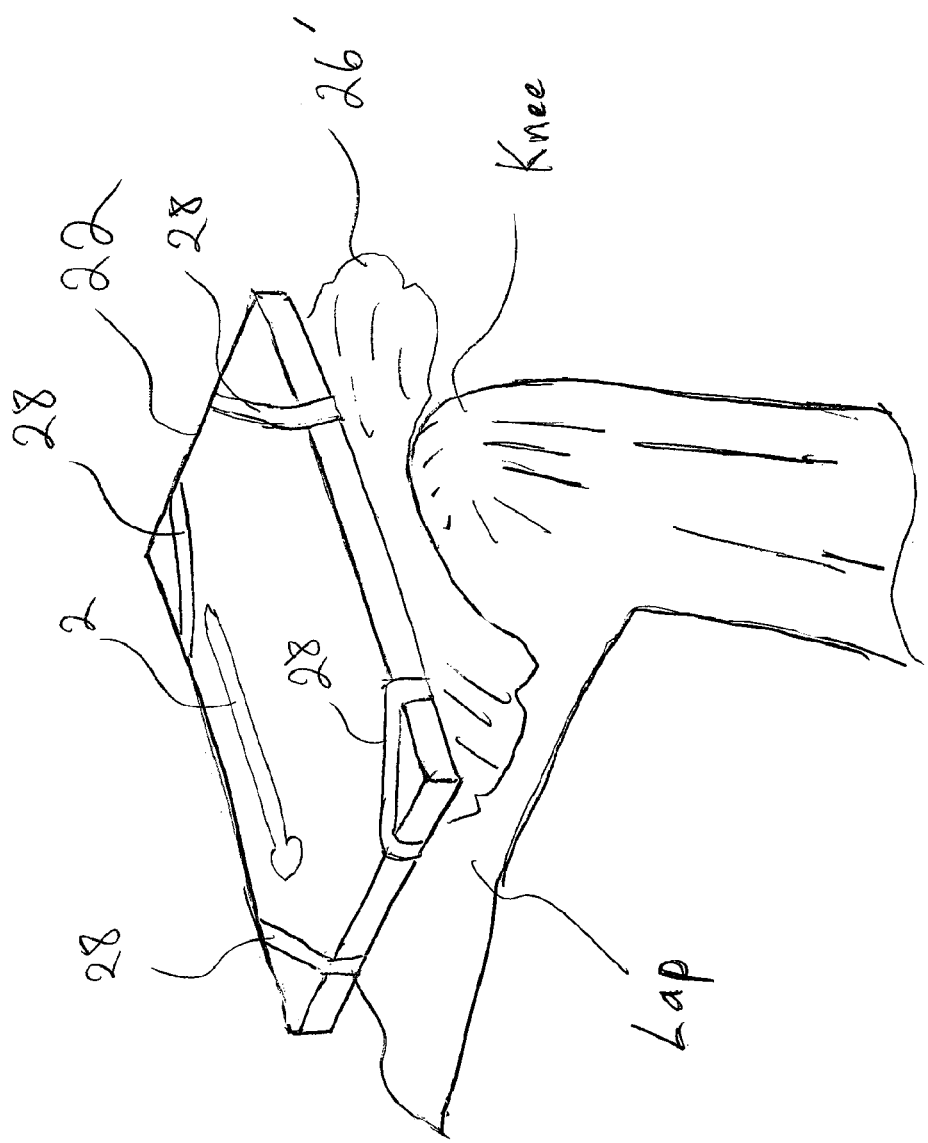
FIG. 9 shows an embodiment of a lap support for use with some embodiments of the base mount of FIGS. 7 & 8.

Referring to FIG. 9, in further embodiments of the present disclosure, the base mount 22 can be attached to a lap support 26. The lap support 26 can be a weighted flexible sack, such as one filled with beads, nut shells, sand or other weighting material. The lap support 26 can be attached to one or more elastic straps 28. In some embodiments, four looped elastic straps 28 are sewn or otherwise attached to the lap support 26, in a position such that corners of the base mount 22 (which may be rectangular in shape in some embodiments, or other shapes in other embodiments) can fit into the looped elastic straps 28, thus attaching the base mount 22 to the lap support 26. In this configuration, a user can place the base mount 22 on an uneven surface, such as the user's knee, as shown in FIG. 9. The lap support 26 can mold to the shape of the surface, and the weight of the lap support 26 can hold the base mount 22 upright on the surface so that a user can perform the nut opening function using the nut opener on the surface.

Although specific embodiments and examples of the disclosure have been described supra for illustrative purposes, various equivalent modifications can be made without departing from the spirit and scope of the disclosure, as will be recognized by those skilled in the relevant art after reviewing the present disclosure. The various embodiments described can be combined to provide further embodiments. The described systems and methods can omit some elements or acts, can add other elements or acts, or can combine the elements or execute the acts in a different order than that illustrated, to achieve various advantages of the disclosure. These and other changes can be made to the disclosure in light of the detailed description.

In general, in the following claims, the terms used should not be construed to limit the invention(s) claimed to the specific embodiments disclosed in the specification.

What is claimed is:

1. A nut opener comprising:
   a handle including an upper elongated member and a lower elongated member, the upper elongated member being connected to the lower elongated member at back end portions of each of the elongated members;
   a cup-shaped member attached to a front end portion of the lower elongated member within which a nut can be placed to rest, with sufficient space between side portions of the nut and walls of the cup-shaped member to allow the shell halves to separate when the nut is split within the cup-shaped member;
   a tooth member extending downward from a front end edge of the upper elongated member, the tooth member having a sharp tip end point with a sufficiently narrow width to enter a pre-existing crack in an otherwise intact pistachio nut shell, the tooth member being the most forward extending structure attached to the upper elongated member, with the width of the tooth member being wider at a base proximate the upper elongated member than at the sharp tip end point of the tooth member disposed furthest away from the upper elongated member;
   wherein the upper elongated member and lower elongated member can be manually forced toward one another from a resting position to contact the sharp tip end point of the tooth member against a nut resting in the cup-shaped member at a location that is rearward of a longitudinal center of the cup-shaped member, and to contact the sharp tip end point of the tooth member against an upwardly facing inside bottom surface of the cup-shaped member;
   wherein the tooth member is set above and apart from a rim of the cup-shaped member when the upper elongated member and lower elongated member are in the resting position; and
   wherein the handle has spring characteristics such that when the upper elongated member and lower elongated member are manually forced toward one another, the elongated members are biased to automatically return to the resting position when the manual force is released.

2. The nut opener of claim 1 wherein the inside bottom surface of the cup-shaped member is flat.

3. The nut opener of claim 1 wherein when the tooth member descends toward the cup-shaped member when the elongated members are forced toward one another to open a nut in the cup-shaped member, the tooth member impacts the nut at a first angle relative to a surface on the cup-shaped member, and changes position to another angle relative to the same surface on the cup-shaped member, as the tooth member descends.

4. The nut opener of claim 1 wherein the cup-shaped member has a rim that is wider than a nut placed in the cup-shaped member.

5. A nut opener comprising:
a first elongated handle portion;
a cup-shaped member connected to a forward portion of the first elongated handle portion, the cup-shaped member having a circular rim;
a second elongated handle portion, the first elongated handle portion being connected to the second elongated handle portion by back end portions of each of the first elongated handle portion and second elongated handle portion, the connected handle portions together forming a handle;
a pointed tooth member having a sufficiently narrow width to enter a pre-existing crack in an otherwise intact pistachio nut shell, the pointed tooth member being connected to a front end edge of the second elongated handle portion with no structural features of the nut opener extending longitudinally forward of the tooth member other than the cup-shaped member;
wherein a concave surface within the circular rim of the cup-shaped member is aligned beneath and faces a tip of the pointed tooth member;
wherein the handle portions of the handle can be pressed toward one another to cause an end portion of the tooth member to descend downward from above a nut placed within and supported by the cup-shaped member, to abut the nut at a location that is rearward of a longitudinal center of the cup-shaped member and to cause the end portion of the tooth member to abut the cup-shaped member at a location that is rearward of the longitudinal center of the cup-shaped member; and
wherein the handle has spring characteristics such that after the handle portions are manually pressed toward one another, the handle portions are biased to automatically return to a resting position of the handle portions when a pressing force is released.

6. The nut opener of claim 5 wherein the cup-shaped member is wider than a nut placed in the cup-shaped member.

7. The nut opener of claim 5 wherein the cup-shaped member has a flat bottom surface.

8. A method of opening pistachio nuts comprising:
placing a pistachio nut with a shell having a pre-existing open crack into a cup-shaped member having a flat inside bottom surface, the cup-shaped member being attached to a longitudinally forward portion of a first elongated handle portion;
allowing the pistachio nut to come to rest within the cup-shaped member;
pressing a second elongated handle portion toward the first elongated handle portion, the first elongated handle portion being connected to the second elongated handle portion at back end portions of each of the first elongated handle portion and second elongated handle portion, wherein a forward end portion of a wedge-shaped tooth member, positioned on a forwardmost portion of the second elongated handle portion, descends downwardly into the open crack in a side of the shell, to initially contact the side of the shell at a longitudinal location that is rearward from a longitudinal center of the cup-shaped member, and wherein the tooth member continues to descend downwardly until a sharp tip end point of the tooth member abuts a bottom inside surface of the cup-shaped member, with the tooth member having slid downward in the crack with sides of the tooth member sliding downward against rims of two shell halves of the pistachio nut shell, whereby the shell is split into two separate shell halves leaving meat of the pistachio nut intact;
allowing the two separate shell halves of the pistachio nut shell to fall away from the cup-shaped member;
biasing a front end of the first elongated handle portion away from a front end of the second elongated handle portion by a spring characteristic of the connection between the back end portions of the handle portions; and
wherein a width of the wedge-shaped tooth member is wider at a base of the tooth member proximate the second elongated handle portion than at the sharp tip end point of the tooth member disposed away from the second elongated handle portion.

\* \* \* \* \*